United States Patent
Wang

(10) Patent No.: US 12,132,905 B2
(45) Date of Patent: Oct. 29, 2024

(54) DECODING METHOD AND CODING METHOD FOR UNMATCHED PIXEL, DECODER, AND ENCODER

(71) Applicant: Tencent Technology (Shenzhen) Company Limited, Shenzhen (CN)

(72) Inventor: Yingbin Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 57 days.

(21) Appl. No.: 17/970,462

(22) Filed: Oct. 20, 2022

(65) Prior Publication Data

US 2023/0042484 A1   Feb. 9, 2023

Related U.S. Application Data

(63) Continuation of application No. PCT/CN2022/075554, filed on Feb. 8, 2022.

(30) Foreign Application Priority Data

Mar. 13, 2021   (CN) .......................... 202110272823.X

(51) Int. Cl.
*H04N 19/13*   (2014.01)
*H04N 19/176*   (2014.01)
(Continued)

(52) U.S. Cl.
CPC ........... *H04N 19/13* (2014.11); *H04N 19/176* (2014.11); *H04N 19/182* (2014.11); *H04N 19/91* (2014.11)

(58) Field of Classification Search
CPC .... H04N 19/13; H04N 19/176; H04N 19/182; H04N 19/593; H04N 19/91; H04N 19/90;
(Continued)

(56) References Cited

U.S. PATENT DOCUMENTS

| 2013/0177069 A1 | 7/2013 | Sze et al. |
| 2013/0188734 A1* | 7/2013 | Kim ...................... H04N 19/13 341/51 |

(Continued)

FOREIGN PATENT DOCUMENTS

| CN | 106416246 A | 2/2017 |
| EP | 3709657 A1 | 9/2020 |
| WO | WO 2021025485 A1 | 2/2021 |

OTHER PUBLICATIONS

Tencent Technology, ISR, PCT/CN2022/075554, Apr. 28, 2022, 2 pgs.

(Continued)

*Primary Examiner* — Nathnael Aynalem
(74) *Attorney, Agent, or Firm* — Morgan, Lewis & Bockius LLP

(57) ABSTRACT

This application provides a method for decoding an unmatched pixel performed by an electronic device. The method includes: obtaining a bit stream of a target video sequence and decoding the bit stream of the target video sequence by at least two entropy decoding methods, to obtain a binary symbol string of an unmatched pixel in a target picture block, the target picture block being obtained by dividing a target picture frame in the target video sequence; inversely binarizing the binary symbol string, to obtain a component value of the unmatched pixel; and obtaining the target picture block based on the component value of the unmatched pixel. This method can improve the flexibility of coding and facilitate equalization between the coding performance and the coding overhead of the unmatched pixel.

14 Claims, 6 Drawing Sheets

(51) Int. Cl.
*H04N 19/182* (2014.01)
*H04N 19/91* (2014.01)

(58) Field of Classification Search
CPC ............. H04N 19/129; H04N 21/2343; H04N 21/4402; H04N 19/174; H04N 19/172; H04N 19/93; H04N 19/70; H04N 19/1887; H04N 19/184; H04N 19/186; H04N 19/50; H04N 19/503; H04N 19/98
USPC ............................................. 375/240–240.29
See application file for complete search history.

(56) References Cited

U.S. PATENT DOCUMENTS

| | | | |
|---|---|---|---|
| 2013/0272377 A1* | 10/2013 | Karczewicz | H03M 7/30 341/51 |
| 2015/0189319 A1* | 7/2015 | Pu | H04N 19/124 375/240.03 |
| 2015/0264348 A1* | 9/2015 | Zou | H04N 19/593 375/240.02 |
| 2015/0264363 A1* | 9/2015 | Pu | H04N 19/93 375/240.02 |

OTHER PUBLICATIONS

Tencent Technology (Shenzhen) Company Limited, WO, PCT/CN2022/075554, Apr. 28, 2022, 4 pgs.
Tencent Technology (Shenzhen) Company Limited, IPRP, PCT/CN2022/075554, Sep. 12, 2023, 5 pgs.

* cited by examiner

DECODING METHOD AND CODING METHOD FOR UNMATCHED PIXEL, DECODER, AND ENCODER

CROSS-REFERENCE TO RELATED APPLICATIONS

This application is a continuation application of PCT Patent Application No. PCT/CN2022/075554, entitled "DECODING METHOD, CODING METHOD, DECODER, AND CODER FOR UNMATCHED PIXELS" filed on Feb. 8, 2022, which claims priority to Chinese Patent Application No. 202110272823.X, filed with the State Intellectual Property Office of the People's Republic of China on Mar. 13, 2021, and entitled "DECODING METHOD AND CODING METHOD FOR UNMATCHED PIXEL, DECODER, AND ENCODER", all of which are incorporated herein by reference in their entirety.

FIELD OF THE TECHNOLOGY

Embodiments of this application relate to the technical field of video or picture processing, and more specifically, to a method for decoding an unmatched pixel and a method for encoding an unmatched pixel, a decoder, and an encoder.

BACKGROUND OF THE DISCLOSURE

The digital video compression technology mainly aims at compressing huge digital video data for transmission and storage. With the rapid increase of Internet videos and an increasingly higher requirement for the video definition by people, although video decompression can be implemented by using the existing digital video compression standards, it is still necessary to pursue a better digital video compression technology to improve the compression performance. Entropy coding is an important video compression technology. Commonly used entropy coding methods include content adaptive binary arithmetic coding (CABAC) and content adaptive variable length coding (CAVLC). A CABAC process mainly includes three steps: binarization, context modeling, and binary arithmetic coding.

After binarization of inputted syntax elements, the binary data may be encoded by a conventional encoding mode and a bypass coding mode. The bypass coding mode does not require the assignment of a specific probability model to each binary bit, and an inputted bin value is directly encoded using a simple bypass encoder to speed up the entire encoding and decoding process.

In general, different syntax elements are not completely independent, and the same syntax elements themselves have a certain memory. Thus, according to the conditional entropy theory, using other coded syntax elements for conditional coding can further improve the coding performance compared with independent coding or memoryless coding. Encoded symbolic information that is used as a condition is referred to as a context. In the conventional coding mode, bins of a syntax element sequentially enter a context modeler. The encoder allocates a suitable probability model for each inputted bin based on a value of a previously encoded syntax element or bin. This process is referred to as context modeling. A context model corresponding to a syntax element can be located via ctxIdxInc (context index increment) and ctxIdxStart (context index start). After feeding the bin and the allocated probability model together into a binary arithmetic encoder for encoding, the context model needs to be updated according to the bin value. This is an adaptive process in the encoding.

However, in the AVS3 standards, for a coding block in an intra string copy prediction mode, Y, Cb, and Cr components of an unmatched pixel are directly coded instead of being derived by using a predicted value. Each component of the unmatched pixel is coded according to its bit depth. For example, a bit depth of a current picture is 10 bits, and when Y, Cb, and Cr components of one unmatched pixel are coded, 3*10 bits of symbols are needed for coding, that is, each symbol bit is coded in a bypass mode, resulting in an excessively large coding overhead of the unmatched pixel.

SUMMARY

This application provides a method for decoding an unmatched pixel and a method for encoding an unmatched pixel, a decoder, and an encoder, which can improve the flexibility of coding and facilitate equalization between the coding performance and the coding overhead of the unmatched pixel.

According to an aspect, this application provides a method for decoding an unmatched pixel, including:
obtaining a bit stream of a target video sequence and decoding the bit stream of the target video sequence by at least two entropy decoding methods, to obtain a binary symbol string of an unmatched pixel in a target picture block, the target picture block being obtained by dividing a target picture frame in the target video sequence;
inversely binarizing the binary symbol string, to obtain a component value of the unmatched pixel; and
obtaining the target picture block based on the component value of the unmatched pixel.

According to another aspect, this application provides a method for encoding an unmatched pixel, including:
obtaining a target video sequence and dividing the target picture frame in the target video sequence into a plurality of picture blocks, the plurality of picture blocks including a target picture block;
adjusting a component value of an unmatched pixel in the target picture block, to obtain an adjusted component value of the unmatched pixel;
binarizing the adjusted component value of the unmatched pixel, to obtain a binary symbol string of the unmatched pixel; and
coding the binary symbol string of the unmatched pixel by at least two entropy coding methods, to obtain a bit stream of the target video sequence.

According to another aspect, an embodiment of this application provides a decoder, for performing the method in the first aspect or the implementations thereof. Further, the decoder includes functional units for performing the method in the first aspect or the implementations thereof.

According to another aspect, an embodiment of this application provides an encoder, for performing the method in the second aspect or the implementations thereof. Further, the encoder includes functional units for performing the method in the second aspect or the implementations thereof.

According to another aspect, an embodiment of this application provides a coding/decoding device, including:
a processor, suitable for implementing computer instructions; and
a computer-readable storage medium, storing computer instructions, the computer instructions being suitable for being loaded and executed by the processor to perform the method according to any one of the first aspect and the second aspect or implementations thereof.

According to another aspect, an embodiment of this application provides a computer-readable storage medium, storing computer instructions, the computer instructions, when being read and executed by a processor of a computer device, causing the computer device to perform the method according to any one of the first aspect and the second aspect or implementations thereof.

According to another aspect, an embodiment of this application provides a computer program product or a computer program, the computer program product or the computer program including computer instructions, the computer instructions being stored in a computer-readable storage medium. A processor of a computer device reads the computer instructions from the computer-readable storage medium and executes the computer instructions to cause the computer device to perform the method according to any one of the first aspect and the second aspect or implementations thereof.

In the embodiments of this application, a bit stream of a target video sequence is decoded by at least two entropy decoding methods, that is, the bit stream of the target video sequence is decoded by using a plurality of entropy decoding methods, which can improve the flexibility of coding and facilitate equalization between the coding performance and the coding overhead of an unmatched pixel.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The technical solutions of the embodiments of this application will be described below with reference to the accompanying drawings. It is obvious that the embodiments to be described are a part rather than all of the embodiments of this application. All other embodiments obtained by a person of ordinary skill in the art based on the embodiments of this application without creative efforts shall fall within the protection scope of this application.

The technology in this application is not limited to any encoding and decoding standard or technology.

Solutions provided in the embodiments of this application may be applied to the technical field of digital video coding, for example, the field of picture coding and decoding, the field of video coding and decoding, the field of hardware video coding and decoding, the field of dedicated circuit video coding and decoding, and the field of real-time video coding and decoding. In other words, the solutions provided in the embodiments of this application may be combined with the Audio Video Coding Standard (AVS), the second generation AVS standard (AVS2), or the third generation AVS standard (AVS3), which further includes, but is not limited to, the H.264/Audio Video coding (AVC) standard, the H.265/High Efficiency Video Coding (HEVC) standard, and the H.266/Versatile Video Coding (VVC) standard. Alternatively, the solution provided in the embodiments of this application may be combined with other dedicated or industrial standards. For example, the standards may specifically include ITU-T H.261, ISO/IEC MPEG-1 Visual, ITU-T H.262, ISO/IEC MPEG-2 Visual, ITU-T H.263, ISO/IEC MPEG-4 Visual, or ITU-T H.264 (also referred to as ISO/IEC MPEG-4 AVC), and include Scalable Video Coding (SVC) extension and Multiview Video Coding (MVC) extension.

In addition, the solutions provided in the embodiments of this application may be used for lossy compression of a picture, or may be used for lossless compression of a picture. The lossless may be visual visually lossless compression, or may be mathematically lossless compression.

Figure 1:
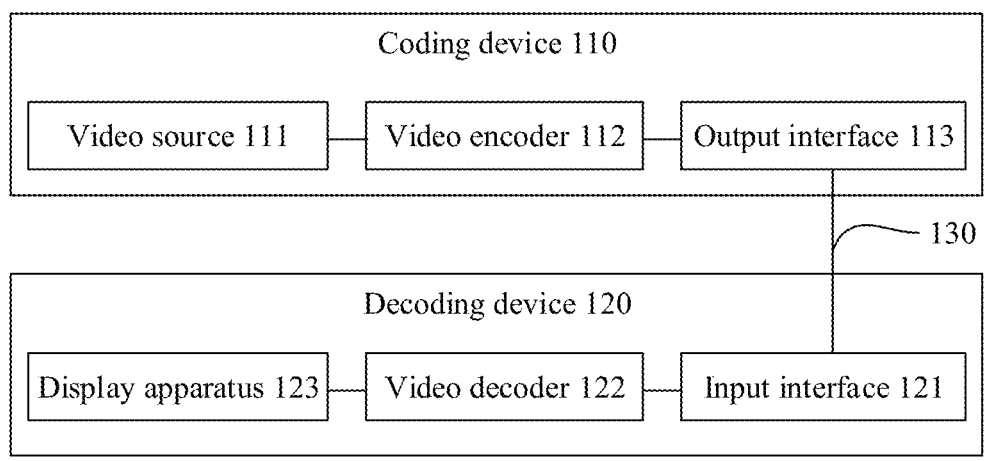
FIG. 1 is a schematic block diagram of a video coding/decoding system according to an embodiment of this application.

For ease of understanding, the video coding/decoding system involved in the embodiments of this application is first described in combination with FIG. 1.

FIG. 1 is a schematic block diagram of a video coding/decoding system 100 according to an embodiment of this application. FIG. 1 is merely an example, and the video coding/decoding system according to the embodiments of this application includes, but is not limited to, the video coding/decoding system shown in FIG. 1. As shown in FIG. 1, the video coding/decoding system 100 includes a coding device 110 and a decoding device 120. The coding device is configured to encode video data (which may be understood as compression) to generate a bit stream and transmit the bit stream to the decoding device. The decoding device decodes the bit stream generated through coding by the coding device to obtain decoded video data.

The coding device 110 may be understood as a device having a video coding function, and the decoding device 120 may be understood as a device having a video decoding function. In other words, the coding device 110 and the decoding device 120 in the embodiments of this application include a wider range of apparatuses, for example, a smartphone, a desktop computer, a mobile computing apparatus, and a notebook (for example, a laptop) computer, a tablet computer, a set-top box, a television set, a camera, a display apparatus, a digital media player, a video game console, an in-vehicle computer, or the like. In some embodiments, the coding device 110 may transmit coded video data (for example, a bit stream) to the decoding device 120 through a channel 130. The channel 130 may include one or more media and/or apparatuses capable of transmitting the coded video data from the coding device 110 to the decoding device 120.

In an example, the channel 130 includes one or more communication media that enable the encoding device 110 to directly transmit encoded video data to the decoding device 120 in real time. In the example, the encoding device 110 may modulate the encoded video data according to a communication standard, and may transmit modulated video data to the decoding device 120. The communication media include wireless communication media, for example, a radio frequency spectrum, and in some embodiments, the communication media may further include wired communication media, for example, one or more physical transmission lines. In another instance, the channel 130 includes a storage medium, and the storage medium may store the video data coded by the coding device 110. The storage medium includes a plurality of local access data storage media, for example, an optical disc, a DVD, a flash memory, or the like. In the instance, the decoding device 120 may obtain the coded video data from the storage medium. In another instance, the channel 130 may include a storage server, and the storage server may store the video data coded by the coding device 110. In this instance, the decoding device 120 may download the stored coded video data from the storage server. Optionally, the storage server may store the coded video data and may transmit the coded video data to the decoding device 120, for example, a web server (for example, for a website), a file transfer protocol (FTP) server, or the like.

In some embodiments, the coding device 110 includes a video encoder 112 and an output interface 113. The output interface 113 may include a modulator/demodulator (modem) and/or a transmitter.

In some embodiments, the coding device 110 may further include a video source 111 in addition to the video encoder 112 and the output interface 113. The video source 111 may include at least one of a video acquisition apparatus (for example, a video camera), a video archive, a video input interface, or a computer graphics system, the video input interface being configured to receive video data from a video content provider, and the computer graphics system being configured to generate video data.

The video encoder 112 encodes video data from the video source 111 to generate a bit stream. The video data may include one or more pictures or a sequence of pictures. The bit stream includes coding information of the picture or sequence of pictures in a form of a bitstream. The encoding information may include encoded image data and associated data. The associated data may include a sequence parameter set (referred to as SPS for short), a picture parameter set (referred to as PPS for short), and other syntax structures. The SPS may include a parameter applied to zero or more sequences. The PPS may include a parameter applied to zero or more images. The syntactic structure refers to a set of zero or more syntax elements arranged in the bitstream in a specified order.

The video encoder 112 directly transmits the coded video data to the decoding device 120 through the output interface 113. The coded video data may also be stored on a storage medium or a storage server for subsequent reading by the decoding device 120.

In some embodiments, the decoding device 120 includes an input interface 121 and a video decoder 122. In some embodiments, the decoding device 120 may further include a display apparatus 123 in addition to the input interface 121 and the video decoder 122. The input interface 121 includes a receiver and/or a modem. The input interface 121 may receive the encoded video data by using the channel 130. The video decoder 122 is configured to decode the coded video data, to obtain decoded video data and transmit the decoded video data to the display apparatus 123.

The display apparatus 123 displays decoded video data. The display apparatus 123 may be integrated with the decoding device 120 or may be outside the decoding device 120. The display apparatus 123 may comprise a plurality of display apparatuses such as a liquid crystal display (LCD), a plasma display, an organic light-emitting diode (OLED) display, or a display apparatus of another type.

FIG. 1 is merely an instance of this application, and the technical solutions of the embodiments of this application are not limited to FIG. 1. For example, the technology of this application may also be applied to one-sided video coding or one-sided video decoding.

The video coding framework involved in the embodiments of this application is described below.

Figure 2:
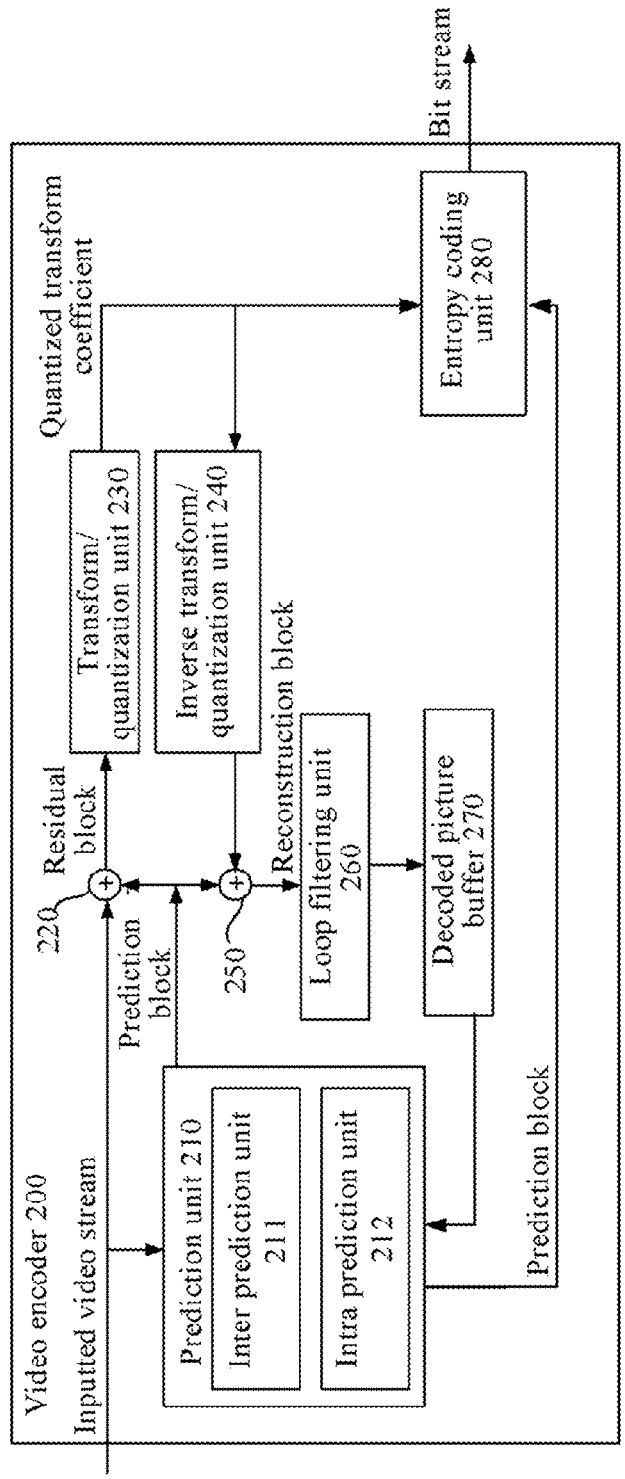
FIG. 2 is a schematic block diagram of a video encoder according to an embodiment of this application.

FIG. 2 is a schematic block diagram of a video encoder 200 according to an embodiment of this application. The video encoder 200 may be used for lossy compression of a picture, or may be used for lossless compression of a picture. The lossless may be visual visually lossless compression, or may be mathematically lossless compression.

The video encoder 200 may be applied to picture data in a luminance and chrominance (YCbCr, YUV) format.

For example, the video encoder 200 reads video data and divides one picture frame into a plurality of coding tree units (CTUs) for each picture frame in the video data. In some examples, the CTB may be referred to as a "tree block", a "largest coding unit" (referred to as LCU for short), or a "coding tree block" (referred to as CTB for short). Each CTU may be associated with an equally-sized pixel block in the image. Each pixel may correspond to one luminance (luminance or luma) sample and two chrominance (chrominance or chroma) samples. Therefore, each CTU may be associated with one luminance sample blocks and two chrominance sample blocks. The size of one CTU is, for example, 128×128, 64×64, 32×32, or the like. One CTU may be further divided into a plurality of coding units (CUs) for coding. The CU may be a rectangular block or a square block. The CU may be further divided into a prediction unit (PU) and a transform unit (transform unit, TU), so that coding, prediction, and transform are separated, which is more flexible for processing. In an example, a CTU is divided into CUs in a quadtree form, and each CU is divided into a TU and a PU in the quadtree form.

The video encoder 200 may support various PU sizes. Assuming that the size of a specific CU is 2N×2N, the video encoder and video decoder may support a PU size of 2N×2N or N×N for intra prediction, and support symmetric PUs of 2N×2N, 2N×N, N×2N, N×N, N×N, or a similar size for inter prediction. The video encoder and the video decoder may also support asymmetric PUs of 2N×nU, 2N×nD, nL×2N, and nR×2N for inter prediction.

As shown in FIG. 2, the video encoder 200 may include:
a prediction unit 210, a residual unit 220, transform/quantization unit 230, an inverse transform/quantization unit 240, a reconstruction unit 250, a loop filtering unit 260, a decoded picture buffer 270, and an entropy coding unit 280. The video encoder 200 may include more, fewer or different functional assemblies.

The prediction unit 210 includes an inter prediction unit 211 and an intra prediction unit 212. Due to the strong correlation between adjacent pixels in one frame of a video, the method of intra prediction is used in the video coding and decoding technology to eliminate spatial redundancy between the adjacent pixels. Due to the strong similarity between adjacent frames in a video, the method of inter prediction is used in the video coding and decoding technology to eliminate temporal redundancy between the adjacent frames, thereby improving the coding efficiency.

The inter prediction unit 211 may be configured for inter prediction, where in the inter prediction, picture information of different frames may be referred to and the inter prediction means finding a reference block from a reference frame by using motion information and generating a prediction block according to the reference block, and is configured to eliminate temporal redundancy. Frames used for the inter prediction may be P frames and/or B frames, the P frames refer to forward prediction frames, and the B frames refer to bi-directional prediction frames. The motion information includes a reference frame list where the reference frame is in, a reference frame index, and a motion vector. The motion vector may be of an entire pixel or of a subpixel. When the motion vector is of a subpixel, a required block of the subpixel needs to be made by performing interpolation filtering in the reference frame. The block of the entire pixel or the subpixel in the reference frame found according to the motion vector is referred to as the reference block. In some technologies, the reference block may be directly used as a prediction block, and in some technologies, the reference block may be further processed to generate a prediction block. Further reprocessing the reference block to generate a prediction block may also be understood as using the reference block as a prediction block and then processing the prediction block to generate a new prediction block. The most commonly used inter prediction methods include: a geometric partitioning mode (GPM) in the VVC video coding and decoding standard and angular weighted prediction (AWP) in the AVS3 video coding and decoding standards. These two intra prediction modes have something in common in principle.

The intra prediction unit 212 refers to only information of a same frame of picture to predict pixel information in a current code picture block, and is configured to eliminate spatial redundancy. A frame used in the intra prediction may be an I frame. Intra prediction modes used in the HEVC include planar, DC, and 33 angle modes, totaling 35 prediction modes. Intra modes used in the VVC include planar, DC, and 65 angle modes, totaling 67 prediction modes. Intra modes used in the AVS3 include DC, plane, bilinear, and 63 angle modes, totaling 66 prediction modes. In some embodiments, the intra prediction unit 212 may be implemented by using an intra block copy technique and an intra string copy technique.

The residual unit 220 may generate a residual block of a CU based on a pixel block of the CU and a prediction block of a PU. For example, the residual unit 220 may generate a residual block of the CU, so that each sample in the residual block has a value equal to a difference between the following two: a sample from pixel blocks of the CU and a corresponding sample from prediction blocks of the PU of the CU.

The transform/quantization unit 230 may quantify a transform coefficient. The transform/quantization unit 230 may quantify a transform coefficient associated with the TU of the CU based on a quantization parameter (QP) value associated with the CU. The video encoder 200 may adjust a degree of quantization applied to the transform coefficient associated with the CU by adjusting the QP value associated with the CU. The inverse transform/quantization unit 240 may apply inverse quantization and inverse transform to the quantized transform coefficient, respectively, to reconstruct a residual block from the quantized transform coefficient.

The reconstruction unit 250 may add a sample from the reconstructed residual block to a corresponding sample of one or more prediction blocks generated by the prediction unit 210 to generate a reconstruction picture block associated with the TU. In this way, a sample block of each TU of the CU is reconstructed, and the video encoder 200 may reconstruct the pixel block of the CU.

The loop filtering unit 260 may perform a block elimination filtering operation to reduce a block effect of a pixel block associated with the CU. In some embodiments, the loop filtering unit 260 includes a deblocking filter unit and a sample point adaptive compensation/adaptive loop filtering (SAO/ALF) unit, the deblocking filter unit is configured to deblock a block effect, and the SAO/ALF unit is configured to remove a ringing effect.

The decoded picture buffer 270 may store a reconstructed pixel block. The inter prediction unit 211 may perform inter prediction on a PU of another picture by using a reference picture including a reconstructed pixel block. In addition, the intra prediction unit 212 may perform intra prediction on another PU in a same picture as the CU by using the reconstructed pixel block in the decoded picture buffer 270.

The entropy coding unit 280 may receive the quantized transform coefficient from the transform/quantization unit 230. The entropy coding unit 280 may perform one or more entropy coding operations on the quantized transform coefficient to generate entropy coded data.

Figure 3:
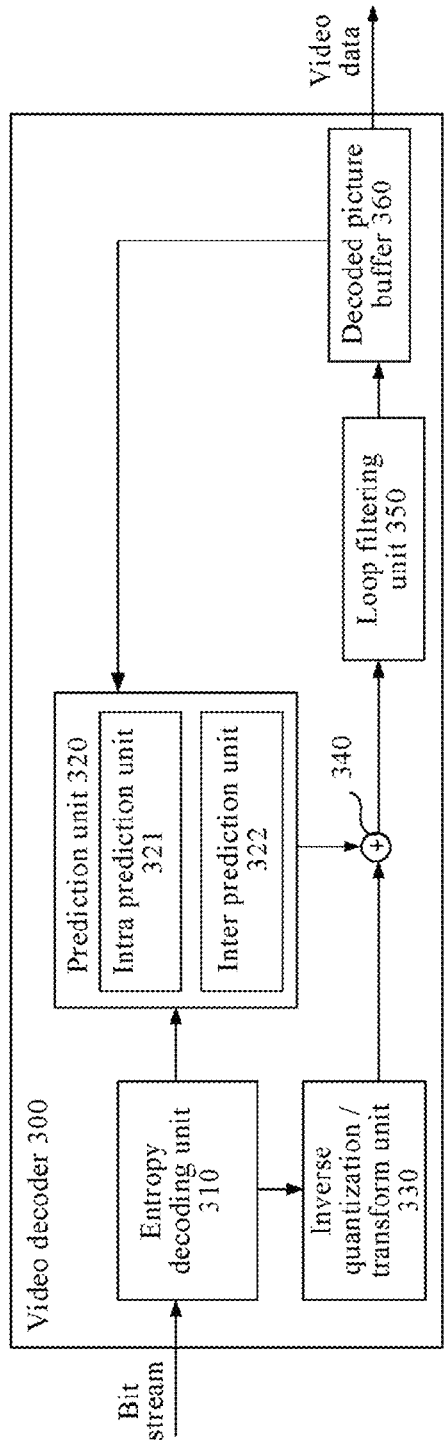
FIG. 3 is a schematic block diagram of a decoding frame according to an embodiment of this application.

FIG. 3 is a schematic block diagram of a video decoder 300 according to an embodiment of this application.

As shown in FIG. 3, the video decoder 300 includes:

an entropy decoding unit 310, a prediction unit 320, an inverse quantization/transform unit 330, a reconstruction unit 340, a loop filtering unit 350, and a decoded picture buffer 360. The video decoding apparatus 300 may include more, fewer or different functional assemblies.

The video decoder 300 may receive a bit stream. The entropy decoding unit 310 may parse the bit stream to extract a syntax element from the bit stream. As part of parsing the bit stream, the entropy decoding unit 310 may parse an entropy coded syntax element in the bit stream. The prediction unit 320, the inverse quantization/transform unit 330, the reconstruction unit 340, and the loop filtering unit 350 may decode video data according to the syntax element extracted from the bit stream, that is, generate decoded video data.

The prediction unit 320 includes an intra prediction unit 321 and an inter prediction unit 322.

The intra prediction unit 321 may perform intra prediction to generate a prediction block of the PU. The intra prediction unit 321 may generate the prediction block of the PU based on spatially adjacent pixel blocks of the PU in an intra prediction mode. The intra prediction unit 321 may also determine the intra prediction mode of the PU based on one or more syntax elements parsed from the bit stream.

The inter prediction unit 322 may construct a first reference picture list (List 0) and a second reference picture list (List 1) based on the syntax elements parsed from the bit stream. In addition, when the PU uses inter prediction coding, the entropy decoding unit 310 may parse motion information of the PU. The inter prediction unit 322 may determine one or more reference blocks of the PU according to the motion information of the PU. The inter prediction unit 322 may generate a prediction block of the PU based on one or more reference blocks of the PU.

The inverse quantization/transform unit 330 reversibly quantizes (that is, dequantizes) the transform coefficient associated with the TU. The inverse quantization/transform unit 330 may determine a degree of quantization by using the QP value associated with the CU of the TU. After reversibly quantizing the transform coefficient, the inverse quantization/transform unit 330 may apply one or more inverse transforms to the reversibly quantized transform coefficient, to generate a residual block associated with the TU.

The reconstruction unit 340 reconstructs a pixel block of the CU by using the residual block associated with the TU of the CU and the prediction block of the PU of the CU. For example, the reconstruction unit 340 may add a sample of the residual block to a corresponding sample of the prediction block, to reconstruct the pixel block of the CU, to obtain the reconstruction picture block.

The loop filtering unit 350 may perform a block elimination filtering operation to reduce a block effect of a pixel block associated with the CU.

The video decoder 300 may store the reconstruction picture of the CU in the decoded picture buffer 360. The video decoder 300 may use the reconstruction picture in the decoded picture buffer 360 as a reference picture for subsequent prediction, or transmit the reconstruction picture to the display apparatus for presentation.

A basic process of video coding and decoding is in the following:

At an encoder side, a frame of picture is divided into blocks, and for a current block, the prediction unit 210 generates a prediction block of the current block through intra prediction or inter prediction. The residual unit 220 may calculate a residual block based on the prediction block and an original block of the current block, that is, a difference between the prediction block and the original block of the current block. The residual block may alternatively be referred to as residual information. Through processes such as transform and quantization by the transform/quantization unit 230, insensitive information of human eyes is removed from the residual block, to eliminate visual redundancy. Optionally, the residual block before the transform and quantization by the transform/quantization unit 230 may be referred to as a temporal residual block, and the temporal residual block after the transform and quantization by the transform/quantization unit 230 may be referred to as a frequency residual block or a frequency domain residual block. The entropy coding unit 280 receives a quantized transform coefficient outputted by the transform quantization unit 230, and may perform entropy coding on the quantized transform coefficient, to output a bit stream. For example, the entropy coding unit 280 may eliminate character redundancy according to a target context model and probability information of a binary bit stream. Optionally, in this application, the current block may be referred to as a current coding unit (CU) or a current prediction unit (PU), or the like. The prediction block may also be referred to as a prediction picture block or a picture prediction block, and the reconstruction picture block may also be referred to as a reconstruction block or a picture reconstruction picture block.

At a decoder side, the entropy decoding unit 310 may parse a bit stream to obtain prediction information, a quantization coefficient matrix, or the like of a current block, and the prediction unit 320 generates a prediction block of the current block by performing intra prediction or inter prediction on the current block based on the prediction information. The inverse quantization/transform unit 330 performs, by using a quantization coefficient matrix obtained from the bit stream, inverse quantization and inverse transform on the quantization coefficient matrix, to obtain a residual block. The reconstruction unit 340 adds the prediction block and the residual block to obtain a reconstruction block. Reconstruction blocks constitute a reconstruction picture, and the loop filtering unit 350 performs loop filtering on the reconstruction picture based on the picture or based on the block, to obtain a decoded picture. The encoder side also needs to perform an operation similar to that of the decoder side, to obtain a decoded picture. The decoded picture may also be referred to as a reconstruction picture, which may serve as a reference frame for inter prediction for a subsequent frame.

The block division information determined by the encoder side, and mode information or parameter information such as prediction, transform, quantization, entropy coding, loop filtering, or the like are carried in the bit stream when necessary. The decoder side determines block division information the same as that of the encoder side, mode information such as predicting, transform, quantization, entropy coding, or loop filtering or parameter information by parsing the bit stream and analyzing according to the existing information, so as to ensure that the decoded picture obtained by the encoder side is the same as that obtained by the decoder side.

It is to also be understood that the foregoing is a basic process of a video encoder and decoder in a block-based hybrid coding framework. With the development of technology, some modules or steps of the framework or process may be optimized. This application is applicable to the basic process of the video encoder and decoder in the block-based hybrid coding framework, but is not limited to the framework and process.

The coding/decoding system, the encoder, and the decoder applicable to the embodiments of this application are described above in combination with FIG. 1 to FIG. 3. From the signal acquisition method, video signals may be obtained by using two methods, namely, captured by a camera and generated by a computer. Due to the difference in statistical characteristics, the corresponding compression coding methods may also be different, but one or more of the following operations and processes may be performed on an inputted original video signal:

1. Block Partition Structure: An inputted image is partitioned into a plurality of non-overlapping processing units according to a size. Similar compression operations are performed on each processing unit. The processing unit is referred to as a coding tree unit (CTU) or a largest coding unit (LCU). A CTU may continue to be further partitioned to obtain one or more basic coding units, referred to as CUs. Each CU is the most basic element in an encoding process. Various possible encoding modes for each CU are described below.

2. Predictive Coding: The predictive coding includes modes such as intra prediction and inter prediction. After an original video signal is predicted by using a selected reconstructed video signal, a residual video signal is obtained. An encoder side needs to select a most suitable one for a current CU from many possible predictive coding modes, and informs a decoder side.

a. Intra-frame prediction: A predicted signal is from an encoded and reconstructed region in the same image.
   b. Inter-frame prediction A predicted signal is from another encoded image (referred to as a reference image) different from a current image.

3. Transform and Quantization: A residual video signal is transformed into a transform domain through a transform operation such as discrete Fourier transform (DFT) and DCT, which is referred to as a transform coefficient. A lossy quantization operation is further performed on a signal in the transform domain, and certain information is discarded, so that a quantized signal is readily available for compression and expression. In some video coding standards, there may be more than one transform modes for selection. Therefore, the encoding end also needs to select one transform mode for the current CU and informs the decoder side of the mode. Fineness of the quantization is generally determined by a quantization parameter (QP). A larger QP indicates that coefficients with a larger value range are to be quantized into a same output, which usually brings greater distortion and a lower bit rate. On the contrary, a smaller QP indicates that coefficients within a smaller value range are to be quantized into a same output, which generally brings less distortion and a higher bit rate.

4. Entropy coding or statistical coding: Statistical compression coding is performed on the quantized signal in the transform domain according to a frequency of occurrence of each value, and finally a binarized (0 or 1) compressed bit stream is outputted. In addition, other information such as a selected mode and a motion vector generated through coding also require entropy coding to reduce a bit rate. Statistical coding is a lossless coding mode that can effectively reduce a bit rate required for expressing a same signal. A common statistical coding mode is Variable Length Coding (VLC) or Content Adaptive Binary Arithmetic Coding (CABAC).

5. Loop filtering: A reconstructed decoded picture may be obtained by performing operations such as inverse quantization, inverse transform, and predictive compensation (inverse operations of 2 to 4 in the foregoing) on an encoded image. Compared with a raw image, in a reconstructed image, some information may be different from that in the raw image due to the impact of quantization, causing a distortion. A filtering operation, for example, deblocking, sample adaptive offset (SAO) filtering, or adaptive loop filter (ALF) filtering, is performed on the reconstructed picture, which can effectively reduce a degree of distortion produced by quantization. Because the filtered reconstructed picture is used as a reference for subsequently encoding a picture and is used for predicting a future signal, the foregoing filtering operation is also referred to as loop filtering, that is, a filtering operation in an encoding loop.

In the decoding process, for each CU, after obtaining a compressed bit stream, a decoder needs to first perform entropy decoding to obtain various mode information and a quantized transform coefficient, so that a residual signal is obtained by inversely quantizing and inversely transforming the coefficients. On the other hand, a predicted signal corresponding to the CU may be obtained according to the known encoding mode information, and a reconstructed signal can be obtained by adding the residual signal and the predicted signal. Finally, a loop filtering operation needs to be performed on a reconstructed value of the decoded picture before a final output signal is generated.

In some mainstream video encoding standards such as HEVC, VVC, and AVS3, a block-based hybrid coding framework is used. In the standards, original video data is divided into a series of coding blocks, and the video data is compressed in combination with video coding methods such as predictive, transform, and entropy coding. Motion compensation is a prediction method commonly used in video encoding, and the motion compensation exports a predicted value of a current coding block from an encoded region based on redundant characteristics of video content in a time domain or space domain. This type of the prediction method includes: inter prediction, intra block copy prediction, intra string copy prediction, or the like. In a specific coding implementation, the prediction methods may be used independently or in combination.

The following is an introduction to the intra string copy prediction.

1. A common string prediction submode in the intra string copy prediction.

By using the intra string copy (ISC) prediction technology, one coding block is partitioned into a series of pixel strings or unmatched pixels according to a scan order (such as a raster scan, a back-and-forth scan, or a Zig-Zag scan). Similar to the IBC technology, a reference string in a same shape is searched in a coded region of the current picture for each string, a predicted value of a current string is exported, and coding is performed on a residual between a pixel value and the predicted value of the current string instead of being directly performed on the pixel value, so that bits can be effectively saved.

Figure 4:
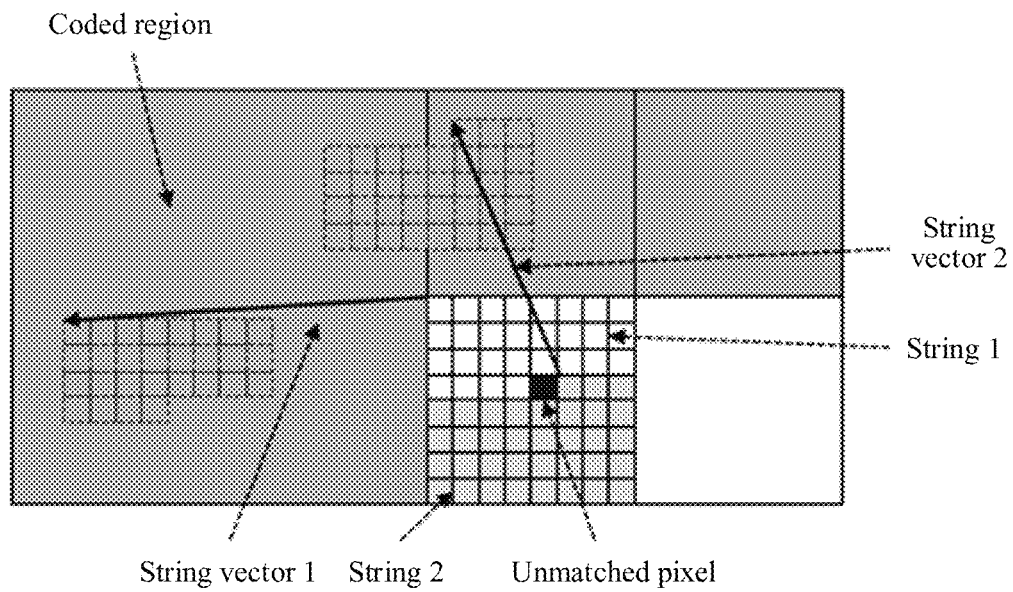
FIG. 4 is a schematic diagram of an intra string copy according to an embodiment of this application.

FIG. 4 is a schematic diagram of intra string copy prediction.

As shown in FIG. 4, dark gray regions are coded regions, 28 white pixels are a string 1, 35 light gray pixels are a string 2, and 1 black pixel represents an unmatched pixel. The unmatched pixel is also referred to as an isolated point, and an original value of the unmatched pixel is directly coded instead of being derived from a predicted value. By using the intra string copy technology, a string vector (SV), a string length, and an identification whether there is a matched string corresponding to each string in the current coding block need to be coded. The string vector (SV) represents a displacement from a to-be-coded string to a reference string thereof. The string length represents a number of pixels included in the string. As shown in FIG. 4, a reference string of the string 1 is on its left side, and a displacement of the string 1 to its corresponding reference string is represented by a string vector 1. A reference string of the string 2 is above it, and a displacement of the string 2 to its corresponding reference string is represented by a string vector 2.

2. An equal value string and unit base vector string submode in the intra string copy prediction.

An equal value string and unit vector string submode is a submode of the intra string copy prediction, and has been adopted in the AVS3 standards in October, 2020. Similar to the intra string copy prediction, in the mode, one coded/decoded block is partitioned in a scan order into a series of pixel strings or unmatched pixels. The type of a pixel string may be an equal value string or a unit base vector string. The characteristic of an equal value string in this mode lies in that all pixels in the pixel string have the same predicted value. The characteristic of the unit vector string (also referred to as a unit base vector string, a unit offset string, a copy upper string, or the like) lies in that its displacement vector is (0, −1), and each pixel of the string uses an upper pixel as a predicted value of the current pixel. In the equal value string mode, type, length, and predicted value information of each string of the current coding block in the bit stream need to be coded. Similar to the common string prediction submode, the predicted value of the unmatched pixel is coded directly instead of being derived by using the predicted value.

In the AVS3 standards, for a coding block in the intra string copy prediction mode, Y, Cb, and Cr components of the unmatched pixel are directly coded instead of being derived by using the predicted value. Each component of the unmatched pixel is coded according to its bit depth. For example, a bit depth of a current picture is 10 bits, and when Y, Cb, and Cr components of one unmatched pixel are coded, 3*10 bits of symbols are needed for coding, that is, each symbol bit is coded in a bypass mode, resulting in an excessively large coding overhead of the unmatched pixel.

This embodiment of this application provides a method for encoding an unmatched pixel. By using the method, each component value of the unmatched pixel is adjusted by an encoder side and an appropriate context model is selected for coding the unmatched pixel, thereby reducing the coding overhead of the unmatched pixel and improving the coding performance. The method provided in this application is applicable to an encoder or decoder which uses an intra string copy prediction mode or any other mode (for example, a palette mode) in which an unmatched pixel needs to be coded, which is not specifically limited in this embodiment of this application.

Figure 5:
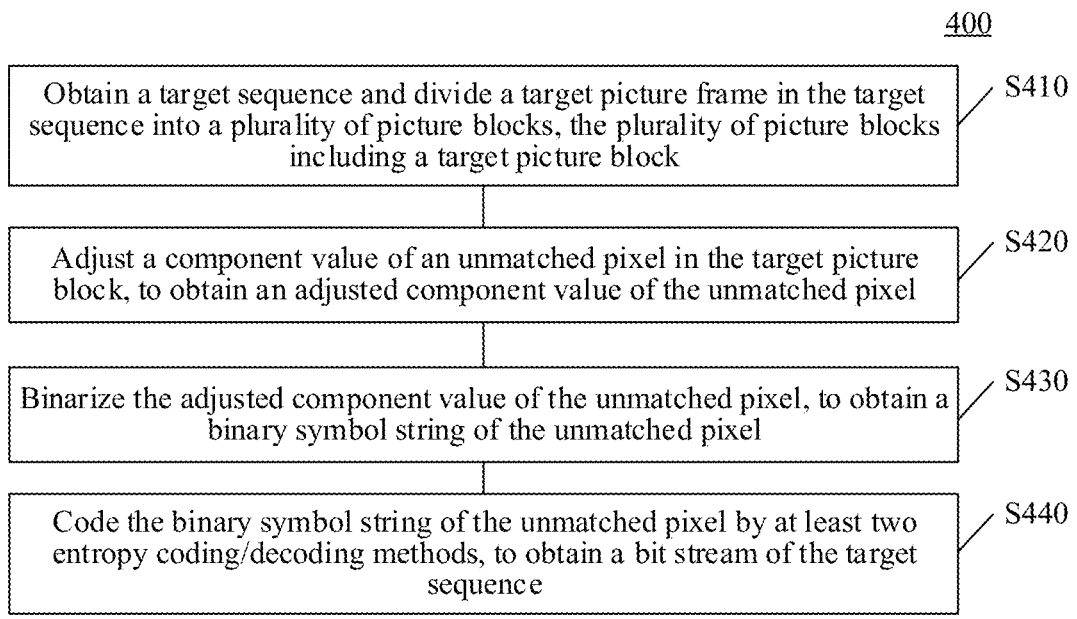
FIG. 5 is a schematic flowchart of a method for encoding an unmatched pixel according to an embodiment of this application.

FIG. 5 is a schematic flowchart of a coding method 400 for an unmatched pixel according to an embodiment of this application. An execution body of the method 400 may include, but is not limited to, the following devices: an encoder or a device for performing block vector coding, for example, a desktop computer, a mobile computing apparatus, a notebook (for example, laptop) computer, a tablet computer, a set-top box, a handset such as a smartphone, a television, a camera, a display apparatus, a digital media player, a video game console, an in-vehicle computer, or similar apparatuses. for example, the coding device 110 shown in FIG. 1 or the video encoder 200 shown in FIG. 2.

As shown in FIG. 5, the coding method 400 for an unmatched pixel may include:

S410: Obtain a target video sequence and divide a target picture frame in the target video sequence into a plurality of picture blocks, the plurality of picture blocks including a target picture block.

S420: Adjust a component value of an unmatched pixel in the target picture block, to obtain an adjusted component value of the unmatched pixel.

S430: Binarize the adjusted component value of the unmatched pixel, to obtain a binary symbol string of the unmatched pixel.

S440: Code the binary symbol string of the unmatched pixel by at least two entropy coding methods, to obtain a bit stream of the target video sequence.

In this embodiment of this application, the bit stream of the target video sequence is coded by using a plurality of entropy coding methods, which can improve the flexibility of coding and facilitate equalization between the coding performance and the coding overhead of an unmatched pixel.

The component value of the unmatched pixel involved in this application may be understood as a value of a color component of the unmatched pixel. For example, for a YUV picture, the component value of the unmatched pixel may be a value of a Y component, a U component, or a V component of the unmatched pixel.

In some embodiments, the length of the binary symbol string is M, M being an integer greater than 0, and the at least two entropy coding methods include a first entropy coding method and a second entropy coding method. S440 may include:

decoding a former-preset first decoding bit of the binary symbol string by the first entropy coding method, and decoding a post-preset second decoding bit of the binary symbol string by the second entropy coding method, to obtain the binary symbol string of the unmatched pixel in the target picture block. The post-preset second target bit may be a preset number of bits to be coded by the second entropy coding method, for example, may be last N bits in the binary symbol string, N being an integer greater than 0, and N being less than M, the former-preset first target bit may be a preset number of bits to be coded and decoded by the first entropy coding method, for example, may be first M-N bits in the binary symbol string.

In other words, the encoder side codes the binary symbol string of the unmatched pixel by at least two entropy coding methods, to obtain a bit stream of the target video sequence.

In some embodiments, the first entropy coding method is a bypass mode, and the second entropy coding method is a content adaptive binary arithmetic coding (CABAC) mode.

In this embodiment of this application, the binary symbol string of the unmatched pixel is coded by at least two entropy coding methods. The at least two entropy coding methods are configured such that the first M-N bits of the binary symbol string are entropy coded in the bypass mode, and the last N bits of the binary symbol string are entropy coded in the content adaptive binary arithmetic coding (CABAC) mode. On one hand, the first M-N bits of the binary symbol string are designed to adopt the bypass mode for entropy coding, which can ensure the coding performance; and on another hand, the last N bits of the binary symbol string adopt the content adaptive binary arithmetic coding (CABAC) mode for entropy coding, which can reduce the coding overhead of the unmatched pixel. On the basis of the above, the solution provided in this application can reduce the coding overhead of the unmatched pixel while guaranteeing the coding performance thereof.

The bypass mode may be understood as the CABAC mode based on the specific probability information. However, setting of the specific probability information may lead to a relatively large coding overhead during use of the bypass mode for entropy coding.

In some embodiments, the method 400 may further include:

writing at least one of the following identifications to the bit stream:

a first identification, a second identification, a third identification, or a fourth identification, where the first identification is used for indicating whether to use the at least two entropy coding methods to perform entropy coding on the unmatched pixel in the target video sequence; the second identification is used for indicating whether to use the at least two entropy coding methods to perform entropy coding on the unmatched pixel in the target picture frame in the target video sequence, the target picture frame including the target picture block; the third identification is used for indicating whether to use the at least two entropy coding methods to perform entropy coding on the unmatched pixel in a target slice in the target picture frame, the target slice including the target picture block; and the fourth identification is used for indicating whether to use the at least two entropy coding methods to perform entropy coding on the unmatched pixel in the target picture block.

A specific value of the first identification, the second identification, the third identification, or the fourth identification may be obtained from corresponding parameter set in a lookup manner, or may be obtained in other manners, which is not specifically limited in this embodiment of this application. For example, values of the identifications in the parameter set may be preset parameters. For example, before coding, a user may set the values of the identifications in the parameter set by setting parameters of an encoder.

In some embodiments, the at least two entropy coding methods are a default mode for the unmatched pixel; and S440 may include:

coding the binary symbol string of the unmatched pixel in the default mode, to obtain a bit stream of the target video sequence.

In other words, the encoder may determine, according to at least one of the following methods, whether to use the method for encoding an unmatched pixel provided in this application for a target picture block:

a) using the method for encoding an unmatched pixel provided in this application by default for an unmatched pixel in the target coding block, that is, not needing to code a mark in the bit stream; b) coding a sequence-level mark in the bit stream, which indicates that the method for encoding an unmatched pixel provided in this application is used for all unmatched pixels of coding blocks in the target video sequence; c) coding a picture-level (frame-level) mark in the bit stream, which indicates that the method for encoding an unmatched pixel provided in this application is used for all unmatched pixels in the target picture frame; d) coding a slice-level mark in the bit stream, which indicates that the method for encoding an unmatched pixel provided in this application is used for all unmatched pixels in a target slice; and e) coding a CU-level (that is, picture block-level) mark in the bit stream, which indicates that the method for encoding an unmatched pixel provided in this application is used for all unmatched pixels the target picture block.

In some embodiments, S420 may include:

performing displacement calculation on the component value of the unmatched pixel, to obtain the adjusted component value of the unmatched pixel.

The displacement calculation may be displacement calculation performed on a component value of the unmatched pixel by using a displacement operator, and may include left shift calculation, or right shift calculation. For example, (val>>N)<<N may be used for the displacement calculation, to obtain an adjusted component value of an unmatched pixel, where val represents a component value of the unmatched pixel before adjustment, >> represents a right shift operator, and << represents a left shift operator.

In other words, the encoder side performs pixel adjustment on the unmatched pixel and selects an appropriate context model for an adjusted component value of the unmatched pixel for coding. Correspondingly, the decoder side selects a corresponding context model for decoding.

In some embodiments, before the performing displacement calculation on the component value of the unmatched pixel, to obtain the adjusted component value of the unmatched pixel, the method 400 may further include:

obtaining a quantization parameter, and determining a value of the post-preset second target bit based on the quantization parameter.

The quantization parameter is a parameter used in the quantization transform during coding and decoding. The post-preset second target bit refers to a preset number of bits to be coded by the second entropy coding method. In an implementation, the encoder may determine a value of N according to the quantization parameter for the target picture block. For example, a greater quantization parameter of the target picture block indicates a greater or smaller value of N. For example, the encoder may determine the value of N based on a correspondence between at least one quantization parameter and at least one value. Further, the encoder may determine the value corresponding to the target picture block as the value of the N.

In some embodiments, the component value of the unmatched pixel is a chrominance component value or a luminance component value, the value of N used during coding when the component value of the unmatched pixel is the chrominance component value is different from the value of N used during coding when the component value of the unmatched pixel is the luminance component value.

In an implementation, val_Y is recorded as the luminance component value of the unmatched pixel before the adjustment, and the encoder side may adjust the luminance component value of the unmatched pixel to (val_Y>>N1)<<N1. In another example, val_U is recorded as the chrominance component value of the unmatched pixel before adjustment, and the encoder side may adjust the chrominance component value of the unmatched pixel to (val_U>>N2)<<N2. Optionally, the value of N1 and the value of N2 may be the same or different, which is not specifically limited in this application. For example, the value of N1 is less than the value of N2, to ensure the coding performance of the luminance component.

In some embodiments, S420 may include:

performing weighted calculation on the component value of the unmatched pixel, to obtain the adjusted component value of the unmatched pixel.

val/K*K may be used for the weighted calculation, to obtain the adjusted component value of the unmatched pixel, where val represents a component value of the unmatched pixel before adjustment, / represents division calculation, * represents multiplication calculation, and K is a weighted coefficient.

The value of K is not specifically limited in this embodiment of this application. For example, K may be equal to N, or may not be equal to N. In another example, K may be a positive integer greater than 0.

In some embodiments, before the performing weighted calculation on the component value of the unmatched pixel, to obtain the adjusted component value of the unmatched pixel, the method 400 may further include:

obtaining a quantization parameter, and determining a value of a weighting coefficient based on the quantization parameter.

In an implementation, the encoder may determine a value of K according to the quantization parameter for the target picture block. For example, a greater quantization parameter of the target picture block indicates a greater or smaller the value of K. For example, the encoder may determine the value of K based on a correspondence between at least one quantization parameter and at least one value. Further, the encoder may determine the value corresponding to the target picture block as the value of K.

In some embodiments, the component value of the unmatched pixel is a chrominance component value or a luminance component value, and the value of K used for the chrominance component value is different from that used for the luminance component value.

In an implementation, val_Y is recorded as the luminance component value of the unmatched pixel before the adjustment, and the encoder side may adjust the luminance component value of the unmatched pixel to val_Y/K1*K1. In another example, val_U is recorded as the chrominance component value of the unmatched pixel before adjustment, and the encoder side may adjust the chrominance component value of the unmatched pixel to val_U/K2*K2. Optionally, the value of K1 and the value of K2 may be the same or different, which is not specifically limited in this application. For example, the value of K1 is less than the value of K2, to ensure the coding performance of the luminance component. In an example, the decoding method provided in this application may be applied to only the luminance component, that is, N1 is not 0 and N2 is 0. In another example, the decoding method provided in this application may be applied to only the chrominance component, that is, N2 is not 0 and N1 is0.

In this embodiment of this application, N and K may be used in combination, that is, K may be used for adjusting the component value of the unmatched pixel, and N may be used for determining a sign bit in a binary symbol string corresponding to each of the at least two entropy coding modes.

The following describes the coding method provided in this application by an example in which a 10-bit depth is used to code an input video in combination with a specific embodiment.

Method 1:
  a) val is recorded as a luminance or chrominance component value of a current unmatched pixel, and the encoder side adjusts the value of val to (val>>2)<<2; and
  b) the encoder side uses a fixed-length code to binarize the adjusted val and export a binary symbol string with a length of 10. First 8 bits of the binary symbol string are entropy coded in the bypass mode, and last 2 bits thereof are entropy coded in the CABAC mode.

Correspondingly, the decoder side decodes a 10-bit binary symbol string from the bit stream, in which the first 8 bits are entropy coded in the bypass mode and the last 2 bits are entropy coded in the CABAC mode; and then the value of val is obtained by inverse binarization by using a fixed-length code method.

Method 2:
  a) the encoder side sets the value of N according to the quantization parameter, and for values 27, 32, 38, and 45, N are set to 2, 2, 3, and 3, respectively;
  b) the encoder side adjusts the value of val to (val>>N)<<N; and
  c) the encoder side binarizes the adjusted val by using fixed-length code, and exports a binary symbol string having a length of 10. First 10-N bits of the binary symbol string are entropy coded in the bypass mode, and last N bits are entropy coded in the CABAC mode.

Correspondingly, the decoder side decodes a 10-bit binary symbol string from the bit stream, in which the first 10-N bits are entropy coded in the bypass mode and the last N bits are entropy coded in the CABAC mode; and then the value of val is obtained by inverse binarization by using a fixed-length code method.

Method 3:
  a) the encoder side sets the value of M according to the quantization parameter, and for values 27, 32, 38, and 45, M are set to 2, 2, 3, and 3, respectively;
  b) a value of val is recorded as a luminance or chrominance component value of a current unmatched pixel, and when val is the luminance component value, the encoder side sets N=M, or otherwise when val is the chrominance component value, the encoder side sets N=M+1;
  c) the encoder side adjusts the value of val to (val>>N)<<N; and
  d) the encoder side binarizes the adjusted val by using a fixed-length code method, and exports a binary symbol string having a length of 10. First 10-N bits of the binary symbol string are entropy coded in the bypass mode, and last N bits are entropy coded in the CABAC mode.

Correspondingly, the decoder side decodes a 10-bit binary symbol string from the bit stream, in which the first 10-N bits are entropy coded in the bypass mode and the last N bits are entropy coded in the CABAC mode; and then the value of val is obtained by inverse binarization by using a fixed-length code method.

The preferred implementations of this application are described in detail above with reference to the accompanying drawings. However, this application is not limited to the specific details in the foregoing implementations. In the scope of the technical idea of this application, various simple variants can be made on the technical solution of this application, and the simple variants all belong to the protection scope of this application. For example, the specific technical features described in the above specific implementations may be combined in any suitable manner without contradiction. To avoid unnecessary repetition, various possible combinations are not further described in this application. In another example, the various implementations of this application may be combined without departing from the idea of the present application, and such combinations shall also fall within the scope of the present application.

It is to be further understood that sequence numbers of the foregoing processes do not mean execution sequences in various embodiments of the present invention. The execution sequences of the processes are to be determined according to functions and internal logic of the processes, and are not to be construed as any limitation on the implementation processes of the embodiments of this application. In addition, the term "and/or" in this embodiment of this application describes only an association relationship for describing associated objects and represents that three relationships may exist. Further, A and/or B may represent: For example, there are three cases: only A exists, both A and B exist, and only B exists. In addition, the character "I" in this specification generally indicates an "or" relationship between the associated objects.

The method for encoding an unmatched pixel provided in the embodiments of this application is described in detail above in combination with FIG. 5, and the method for decoding an unmatched pixel provided in the embodiments of this application is described below in combination with FIG. 6.

Figure 6:
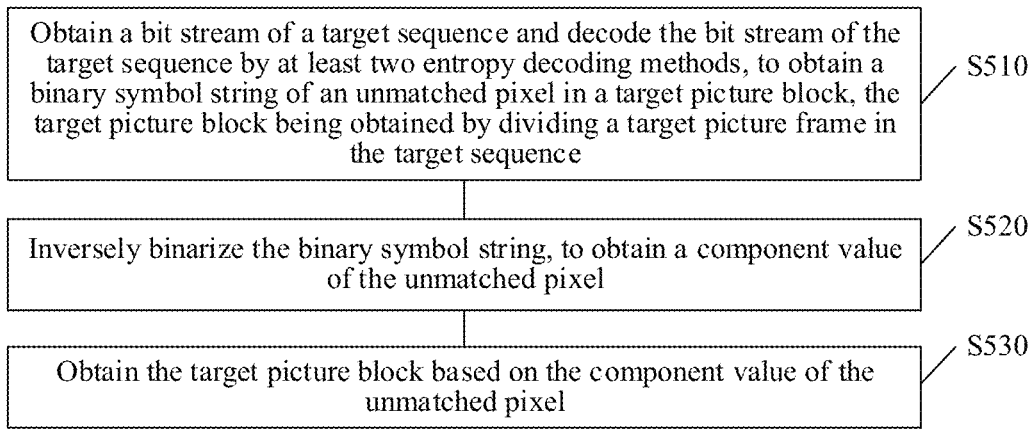
FIG. 6 is a schematic flowchart of a method for decoding an unmatched pixel according to an embodiment of this application.

FIG. 6 is a schematic flowchart of a decoding method 500 for an unmatched pixel according to an embodiment of this application. An execution body of the method 500 may include, but is not limited to, the following devices: a decoder or a device for performing block vector coding, for example, a desktop computer, a mobile computing apparatus, a notebook (for example, laptop) computer, a tablet computer, a set-top box, a handset such as a smartphone, a television, a camera, a display apparatus, a digital media player, a video game console, an in-vehicle computer, or similar apparatuses. For example, the decoding device 120 shown in FIG. 1 or the video decoder 300 shown in FIG. 3.

As shown in FIG. 6, the decoding method 500 for an unmatched pixel may include:

S510: Obtain a bit stream of a target video sequence and decode the bit stream of the target video sequence by at least two entropy decoding methods, to obtain a binary symbol string of an unmatched pixel in a target picture block, the target picture block being obtained by dividing a target picture frame in the target video sequence.

S520: Inversely binarize the binary symbol string, to obtain a component value of the unmatched pixel.

S530: Obtain the target picture block based on the component value of the unmatched pixel.

In some embodiments, the length of the binary symbol string is M, M being an integer greater than 0, and the at least two entropy decoding methods include a first entropy decoding method and a second entropy decoding method; and S510 may include:

decoding a former-preset first target bit of the binary symbol string by the first entropy decoding method, and decoding a post-preset second target bit of the binary symbol string by the second entropy decoding method, to obtain the binary symbol string of the unmatched pixel in the target picture block, where a sum of the former-preset first target bit and the post-preset second target bit is a length of the binary symbol string.

In some embodiments, the first entropy decoding method is a bypass mode, and the second entropy decoding method is a content adaptive binary arithmetic coding (CABAC) mode.

In this embodiment of this application, a bit stream of a target video sequence is decoded by at least two entropy decoding methods. The at least two entropy decoding methods are configured such that the first M-N bits of the binary symbol string are entropy decoded in the bypass mode, and the last N bits of the binary symbol string are entropy decoded in the content adaptive binary arithmetic coding (CABAC) mode. On one hand, the first M-N bits of the binary symbol string are designed to adopt the bypass mode for entropy decoding, which can ensure the coding performance; and on another hand, the last N bits of the binary symbol string adopt the content adaptive binary arithmetic coding (CABAC) mode for entropy decoding, which can reduce the coding overhead of the unmatched pixel. On the basis of the above, the solution provided in this application can reduce the decoding overhead of the unmatched pixel while guaranteeing the coding performance thereof.

In some embodiments, before the decoding the bit stream of the target video sequence by at least two entropy decoding methods, to obtain a binary symbol string of an unmatched pixel in a target picture block, the method 500 further includes:

parsing the bit stream of the target video sequence, to obtain at least one of the following identifications:

a first identification, a second identification, a third identification, or a fourth identification, where the first identification is used for indicating whether to use the at least two entropy decoding methods to perform entropy decoding on the unmatched pixel in the target video sequence; the second identification is used for indicating whether to use the at least two entropy decoding methods to perform entropy decoding on the unmatched pixel in the target picture frame in the target video sequence, the target picture frame including the target picture block; the third identification is used for indicating whether to use the at least two entropy decoding methods to perform entropy decoding on the unmatched pixel in a target slice in the target picture frame, the target slice including the target picture block; and the fourth identification is used for indicating whether to use the at least two entropy decoding methods to perform entropy decoding on the unmatched pixel in the target picture block. S510 may include:

when the first identification, the second identification, the third identification, or the fourth identification is used for indicating that the at least two entropy decoding methods are used for entropy decoding, decoding the bit stream of the target video sequence by the at least two entropy decoding methods, to obtain the binary symbol string of the unmatched pixel in the target picture block.

In some embodiments, the at least two entropy decoding methods are a default mode for the unmatched pixel; and S510 may include:

decoding the bit stream of the target video sequence in the default mode, to obtain the binary symbol string of the unmatched pixel in the target picture block.

In other words, the decoder may determine, according to at least one of the following methods, whether to use the method for decoding an unmatched pixel provided in this application for a target picture block:

a) using the method for decoding an unmatched pixel provided in this application by default for an unmatched pixel in the target decoding block, that is, not needing to decode a mark in the bit stream; b) decoding a sequence-level mark in the bit stream, which indicates that the method for decoding an unmatched pixel provided in this application is used for all unmatched pixels of decoding blocks in the target video sequence; c) decoding a picture-level (frame-level) mark in the bit stream, which indicates that the method for decoding an unmatched pixel provided in this application is used for all unmatched pixels in the target picture frame; d) decoding a slice-level mark in the bit stream, which indicates that the method for decoding an unmatched pixel provided in this application is used for all unmatched pixels in a target slice; and e) decoding a CU-level (that is, picture block-level) mark in the bit stream, which indicates that the method for decoding an unmatched pixel provided in this application is used for all unmatched pixels the target picture block.

In some embodiments, before the decoding the bit stream of the target video sequence by at least two entropy decoding methods, to obtain a binary symbol string of an unmatched pixel in a target picture block, the method 500 further includes:

obtaining a quantization parameter, and determining a value of the post-preset second target bit based on the quantization parameter.

In an implementation, the decoder may determine a value of N according to the quantization parameter for the target picture block. For example, a greater quantization parameter of the target picture block indicates a greater or smaller value of N. For example, the decoder may determine the value of N based on a correspondence between at least one quantization parameter and at least one value. Further, the decoder may determine the value corresponding to the target picture block as the value of the N.

In some embodiments, the component value of the unmatched pixel is a chrominance component value or a luminance component value, the value of N used during decoding when the component value of the unmatched pixel is the chrominance component value is different from the value of N used during decoding when the component value of the unmatched pixel is the luminance component value.

In an implementation, val_Y is recorded as the luminance component value of the unmatched pixel before the adjustment, and the encoder side may adjust the luminance component value of the unmatched pixel to $(val\_Y \gg N1) \ll N1$.

In another example, val_U is recorded as the chrominance component value of the unmatched pixel before adjustment, and the encoder side may adjust the chrominance component value of the unmatched pixel to (val_U>>N2)<<N2. Optionally, the value of N1 and the value of N2 may be the same or different, which is not specifically limited in this application. For example, the value of N1 is less than the value of N2, to ensure the coding performance of the luminance component. In an example, the decoding method provided in this application may be applied to only the luminance component, that is, N1 is not 0 and N2 is 0. In another example, the decoding method provided in this application may be applied to only the chrominance component, that is, N2 is not 0 and N1 iso.

The decoding process is a reverse operation of the coding process, and related description of the coding method 400 may be referred to for the decoding method 500, which is not repeated herein for the purpose of avoiding duplication.

Figure 7:
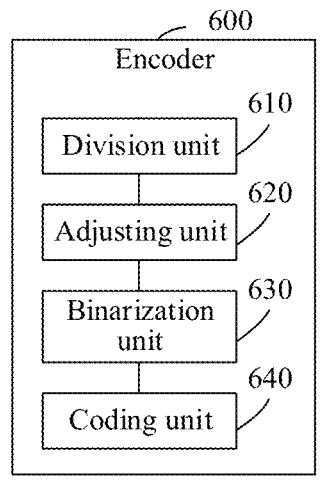
FIG. 7 is a schematic block diagram of an encoder according to an embodiment of this application.
Figure 8:
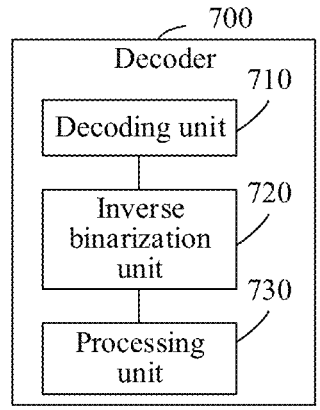
FIG. 8 is a schematic block diagram of a decoder according to an embodiment of this application.
Figure 9:
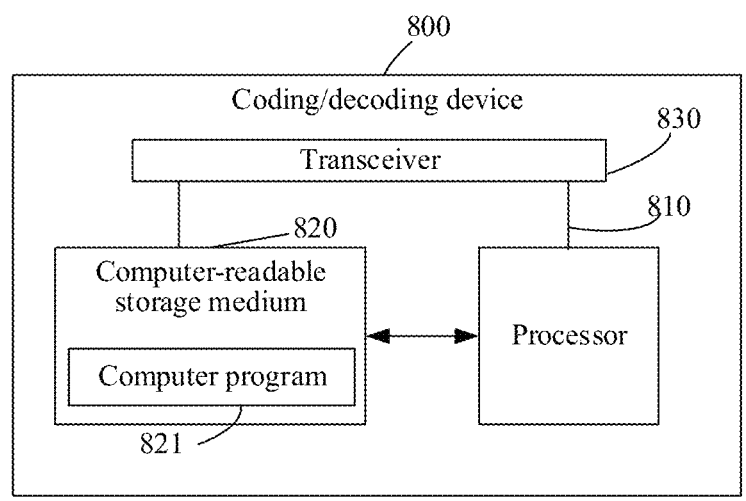
FIG. 9 is a schematic block diagram of a coding/decoding device according to an embodiment of this application.

The foregoing describes the method embodiments of this application in detail in combination with FIG. 5 to FIG. 6, and the following describes apparatus embodiments of this application in detail in combination with FIG. 7 to FIG. 9.

FIG. 7 is a schematic flowchart of an encoder 600 according to an embodiment of this application.

As shown in FIG. 7, the encoder 600 may include:
a division unit 610, configured to obtain a target video sequence and divide the target picture frame in the target video sequence into a plurality of picture blocks, the plurality of picture blocks including a target picture block;
an adjusting unit 620, configured to adjust a component value of an unmatched pixel in the target picture block, to obtain an adjusted component value of the unmatched pixel;
a binarization unit 630, configured to binarize the adjusted component value of the unmatched pixel, to obtain a binary symbol string of the unmatched pixel; and
a coding unit 640, configured to code the binary symbol string of the unmatched pixel by at least two entropy coding methods, to obtain a bit stream of the target video sequence.

In the embodiments of this application, a bit stream of a target video sequence is decoded by at least two entropy coding methods, that is, the bit stream of the target video sequence is coded by using a plurality of entropy coding methods, which can improve the flexibility of coding and facilitate equalization between the coding performance and the coding overhead of an unmatched pixel.

In some embodiments, the at least two entropy coding methods include a first entropy coding method and a second entropy coding method; and the coding unit 640 is further configured to:
decode a former-preset first target bit of the binary symbol string by the first entropy coding method, and decode a post-preset second target bit of the binary symbol string by the second entropy coding method, to obtain a bit stream of the target video sequence, where a sum of the former-preset first target bit and the post-preset second target bit is a length of the binary symbol string.

In some embodiments, the first entropy coding method is a bypass mode, and the second entropy coding method is a content adaptive binary arithmetic coding mode.

In some embodiments, the coding unit 640 is further configured to:
write at least one of the following identifications to the bit stream:

a first identification, a second identification, a third identification, or a fourth identification, where
the first identification is used for indicating whether to use the at least two entropy coding methods to perform entropy coding on the unmatched pixel in the target video sequence; the second identification is used for indicating whether to use the at least two entropy coding methods to perform entropy coding on the unmatched pixel in the target picture frame in the target video sequence, the target picture frame including the target picture block; the third identification is used for indicating whether to use the at least two entropy coding methods to perform entropy coding on the unmatched pixel in a target slice in the target picture frame, the target slice including the target picture block; and the fourth identification is used for indicating whether to use the at least two entropy coding methods to perform entropy coding on the unmatched pixel in the target picture block.

In some embodiments, the at least two entropy coding methods are a default mode for the unmatched pixel; and the coding unit 640 is further configured to:
code the binary symbol string of the unmatched pixel in the default mode, to obtain a bit stream of the target video sequence.

In some embodiments, the adjusting unit 620 is further configured to:
perform displacement calculation on the component value of the unmatched pixel, to obtain the adjusted component value of the unmatched pixel.

In some embodiments, before the performing displacement calculation on the component value of the unmatched pixel, to obtain the adjusted component value of the unmatched pixel, the adjusting unit 620 is further configured to:
obtain a quantization parameter, and determine a value of the post-preset second target bit based on the quantization parameter.

In some embodiments, the component value of the unmatched pixel is a chrominance component value or a luminance component value.

In some embodiments, S420 may include:
performing weighted calculation on the component value of the unmatched pixel, to obtain the adjusted component value of the unmatched pixel.

FIG. 8 is a schematic flowchart of a decoder 700 according to an embodiment of this application.

As shown in FIG. 8, the decoder 700 may include:
a decoding unit 710, configured to obtain a bit stream of a target video sequence and decode the bit stream of the target video sequence by at least two entropy decoding methods, to obtain a binary symbol string of an unmatched pixel in a target picture block, the target picture block being obtained by dividing a target picture frame in the target video sequence;
an inverse binarization unit 720, configured to inversely binarize the binary symbol string, to obtain a component value of the unmatched pixel; and
a processing unit 730, configured to obtain the target picture block based on the component value of the unmatched pixel.

In some embodiments, the at least two entropy decoding methods include a first entropy decoding method and a second entropy decoding method; and the decoding unit 710 is further configured to:
decode a former-preset first target bit of the binary symbol string by the first entropy decoding method, and decode a post-preset second target bit of the binary symbol string by the second entropy decoding method, to obtain the binary symbol string of the unmatched pixel in the target picture block, where a sum of the former-preset first target bit and the post-preset second target bit is a length of the binary symbol string.

In some embodiments, the first entropy decoding method is a bypass mode, and the second entropy decoding method is a content adaptive binary arithmetic coding mode.

In some embodiments, before the decoding the bit stream of the target video sequence by at least two entropy decoding methods, to obtain a binary symbol string of an unmatched pixel in a target picture block, the decoding unit 710 is further configured to:

parse the bit stream of the target video sequence, to obtain at least one of the following identifications:

a first identification, a second identification, a third identification, or a fourth identification, where the first identification is used for indicating whether to use the at least two entropy decoding methods to perform entropy decoding on the unmatched pixel in the target video sequence; the second identification is used for indicating whether to use the at least two entropy decoding methods to perform entropy decoding on the unmatched pixel in the target picture frame in the target video sequence, the target picture frame including the target picture block; the third identification is used for indicating whether to use the at least two entropy decoding methods to perform entropy decoding on the unmatched pixel in a target slice in the target picture frame, the target slice including the target picture block; and the fourth identification is used for indicating whether to use the at least two entropy decoding methods to perform entropy decoding on the unmatched pixel in the target picture block. the decoding unit 710 is further configured to:

when the first identification, the second identification, the third identification, or the fourth identification is used for indicating that the at least two entropy decoding methods are used for entropy decoding, decode the bit stream of the target video sequence by the at least two entropy decoding methods, to obtain the binary symbol string of the unmatched pixel in the target picture block.

In some embodiments, the at least two entropy decoding methods are a default mode for the unmatched pixel; and the decoding unit 710 is further configured to:

decode the bit stream of the target video sequence in the default mode, to obtain the binary symbol string of the unmatched pixel in the target picture block.

In some embodiments, before the decoding the bit stream of the target video sequence by at least two entropy decoding methods, to obtain a binary symbol string of an unmatched pixel in a target picture block, the decoding unit 710 is further configured to:

obtain a quantization parameter, and determine a value of the post-preset second target bit based on the quantization parameter.

In some embodiments, the component value of the unmatched pixel is a chrominance component value or a luminance component value, and the value of N used for the chrominance component value is different from that used for the luminance component value.

It is to be understood that the apparatus embodiment and the method embodiment may correspond to each other. For a similar description, refer to the method embodiment. To avoid repetition, details are not described herein again.

Further, the encoder 600 shown in FIG. 7 may correspond to the body in the method 400 of the embodiments of this application, that is, the foregoing and other operations and/or functions of the units in the encoder 600 are to respectively implement the corresponding processes in the methods such as the method 400. The decoder 700 shown in FIG. 8 may correspond to the body in the method 500 of the embodiments of this application, and the foregoing and other operations and/or functions of the units in the decoder 700 are to respectively implement the corresponding processes in the methods such as the method 500.

It is further to be understood that the units of the encoder 600 or the decoder 700 involved in the embodiments of this application may be separately or wholly combined into one or several other units, or one (or more) of the units herein may further be divided into multiple units of smaller functions. In this way, same operations can be implemented, and implementation of the technical effects of the embodiments of this application is not affected. The foregoing units are divided based on logical functions. In an actual application, a function of one unit may also be implemented by multiple units, or functions of multiple units are implemented by one unit. In other embodiments of this application, the encoder 600 or the decoder 700 may also include other units. In an actual application, these functions may also be cooperatively implemented by other units and may be cooperatively implemented by multiple units. According to another embodiment of this application, a computer program (including program code) that can perform the steps in the corresponding method may be run on a general computing device of a general computer, which includes processing elements and storage elements such as a central processing unit (CPU), a random access memory (RAM), and a read-only memory (ROM), to construct the encoder 600 or the decoder 700 and implement the method for encoding an unmatched pixel or the method for decoding an unmatched pixel in the embodiments of this application. The computer program may be recorded in, for example, a computer-readable storage medium, and may be loaded into the electronic device by using the computer-readable storage medium, and run in the electronic device, to implement the corresponding methods in the embodiments of this application.

In other words, the units involved above may be implemented in a form of hardware, or may be implemented by instructions in a form of software, or may be implemented in a form of a combination of software and hardware. Further, the steps of the method embodiments in the embodiments of this application may be completed by instructions in a form of an integrated logic circuit and/or software of hardware in a processor. The steps in the methods disclosed with reference to the embodiments of this application may be directly performed and completed by a hardware decoding processor, or may be performed and completed by using a combination of hardware and software in the decoding processor. Optionally, a software device may be located in a mature storage medium in the art, such as a random access memory, a flash memory, a read-only memory, a programmable read-only memory, an electrically erasable programmable memory, a register, or the like. The storage medium is located in the memory. The processor reads information in the memory and completes the steps of the foregoing method embodiments in combination with hardware thereof.

FIG. 9 is a schematic structural diagram of a coding/decoding device 800 according to an embodiment of this application.

As shown in FIG. 9, the coding/decoding device 800 includes at least a processor 710 and a computer-readable storage medium 720. The processor 710 and the computer-readable storage medium 720 may be connected by a bus or in another manner. The computer storage medium 720 is configured to store a computer program 721. The computer program 721 includes computer instructions. The processor 710 is configured to execute the computer instructions stored in the computer storage medium 720. The processor 710 is a computing core and a control core of the coding/decoding device 800, is suitable for implementing one or more computer instructions, and is specifically suitable for loading and executing one or more computer instructions to implement a corresponding method procedure or a corresponding function.

In an example, the processor 710 may also be referred to as a central processing unit (CPU). The processor 710 may include, but is not limited to: a general-purpose processor, a digital signal processor (DSP), an application-specific integrated circuit (ASIC), a field programmable gate array (FPGA), or another programmable logical device, discrete gate or transistor logical device, or discrete hardware component, and the like In an example, the computer-readable storage medium 720 may be a high-speed RAM, or may be a non-volatile memory, for example, at least one magnetic disk memory. Optionally, the computer-readable storage medium may be at least one computer-readable storage medium far away from the foregoing processor 710. Specifically, the computer-readable storage medium 720 includes, but not limited to: a volatile memory and/or a non-volatile memory. The non-volatile memory may be a read-only memory (ROM), a programmable ROM (PROM), an erasable programmable read-only memory (EPROM), an electrically EPROM (EEPROM), or a flash memory. The volatile memory may be a random access memory (RAM), and is used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM) and a direct Rambus random access memory (DR RAM).

In an implementation, the coding/decoding device 800 may be the encoder side, the encoder, or the coding framework involved in the embodiments of this application. The computer-readable storage medium 720 stores a first computer instruction. The processor 710 loads and executes the first computer instruction stored in the computer-readable storage medium 720, to implement the corresponding steps in the method for encoding an unmatched pixel provided in the embodiments of this application. In other words, the first computer instruction in the computer-readable storage medium 720 is loaded by the processor 710 to perform the corresponding steps, which is not repeated herein for the purpose of avoiding duplication.

In an implementation, the coding/decoding device 800 may be the decoder side, the decoder, or the decoding framework involved in the embodiments of this application. The computer-readable storage medium 720 stores a second computer instruction. The processor 710 loads and executes the second computer instruction stored in the computer-readable storage medium 720, to implement the corresponding steps in the method for decoding an unmatched pixel provided in the embodiments of this application. In other words, the second computer instruction in the computer-readable storage medium 720 is loaded by the processor 710 to perform the corresponding steps, which is not repeated herein for the purpose of avoiding duplication.

according to another aspect of this application, the embodiments of this application further provide a computer-readable storage medium (a memory), and the computer-readable storage medium is a memory device in the coding/decoding device 800 and is configured to store programs and data, for example, the computer-readable storage medium 720. It may be understood that the computer-readable storage medium 720 herein may include an internal storage medium of the coding/decoding device 800 and certainly may also include an extended storage medium supported by the coding/decoding device 800. The computer storage medium provides storage space, and the storage space stores an operating system of the coding/decoding device 800. In addition, the storage space further stores one or more computer instructions suitable for being loaded and executed by the processor 710. The computer instructions may be one or more computer programs 721 (including program code).

According to another aspect of this application, a computer program product or a computer program is provided, the computer program product or the computer program including computer instructions, the computer instructions being stored in a computer-readable storage medium. for example, the computer programs 721. In this case, the coding/decoding device 800 may be a computer, the processor 710 reads the computer instruction from the computer-readable storage medium 720, and the processor 710 executes the computer instruction, so that the computer performs the method for encoding an unmatched pixel or the method for decoding an unmatched pixel provided in the implementations described above.

In other words, when software is used for implementation, all or some of the embodiments may be implemented in the form of a computer program product. The computer program product includes one or more computer instructions. When the computer program instructions are loaded and executed on the computer, the procedures or functions according to the embodiments of this application are all or partially run. The computer may be a general-purpose computer, a special-purpose computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server or data center to another website, computer, server or data center in a wired (for example, a coaxial cable, an optical fiber or a digital subscriber line (digital subscriber line, DSL)) or wireless (for example, infrared, wireless or microwave) manner.

A person of ordinary skill in the art may notice that the exemplary units and process steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of this application.

Finally, the foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for decoding an unmatched pixel performed by an electronic device, comprising:
   obtaining a bit stream of a target video sequence and decoding the bit stream of the target video sequence by at least two entropy decoding methods, to obtain a binary symbol string of an unmatched pixel in a target picture block, the target picture block being obtained by dividing a target picture frame in the target video sequence, wherein the at least two entropy decoding methods comprise a first entropy decoding method and a second entropy decoding method and the decoding the bit stream of the target video sequence by at least two entropy decoding methods further comprising:
   obtaining a quantization parameter associated with the bit stream;
   determining a value of a former-preset first target bits of the binary symbol and a value of a post-preset second target bits of the binary symbol based on the quantization parameter and a length of the binary symbol, wherein a sum of the preset first target bits and the preset second target bits is the length of the binary symbol string and a ratio of the preset first target bits and the preset second target bits is dependent upon the quantization parameter; and
   decoding the former-preset first target bits of the binary symbol string by the first entropy decoding method, and decoding the post-preset second target bits of the binary symbol string by the second entropy decoding method, to obtain the binary symbol string of the unmatched pixel in the target picture block;
   inversely binarizing the binary symbol string, to obtain a component value of the unmatched pixel; and
   obtaining the target picture block based on the component value of the unmatched pixel.

2. The method according to claim 1, wherein the first entropy decoding method is a bypass mode, and the second entropy decoding method is a content adaptive binary arithmetic coding mode.

3. The method according to claim 1, wherein the method further comprises:
   before decoding the bit stream of the target video sequence by the at least two entropy decoding methods:
   parsing the bit stream of the target video sequence, to obtain at least one of the following identifications:
   a first identification, a second identification, a third identification, or a fourth identification, wherein
   the first identification is used for indicating whether to use the at least two entropy decoding methods to perform entropy decoding on the unmatched pixel in the target video sequence; the second identification is used for indicating whether to use the at least two entropy decoding methods to perform entropy decoding on the unmatched pixel in the target picture frame in the target video sequence, the target picture frame comprising the target picture block; the third identification is used for indicating whether to use the at least two entropy decoding methods to perform entropy decoding on the unmatched pixel in a target slice in the target picture frame, the target slice comprising the target picture block; and the fourth identification is used for indicating whether to use the at least two entropy decoding methods to perform entropy decoding on the unmatched pixel in the target picture block, wherein
   the decoding the bit stream of the target video sequence by at least two entropy decoding methods, to obtain a binary symbol string of an unmatched pixel in a target picture block comprises:
   when the first identification, the second identification, the third identification, or the fourth identification is used for indicating that the at least two entropy decoding methods are used for entropy decoding, decoding the bit stream of the target video sequence by the at least two entropy decoding methods, to obtain the binary symbol string of the unmatched pixel in the target picture block.

4. The method according to claim 1, wherein the at least two entropy decoding methods are a default mode for the unmatched pixel; and
   the decoding the bit stream of the target video sequence by at least two entropy decoding methods, to obtain a binary symbol string of an unmatched pixel in a target picture block comprises:
   decoding the bit stream of the target video sequence in the default mode, to obtain the binary symbol string of the unmatched pixel in the target picture block.

5. The method according to claim 1, wherein the component value of the unmatched pixel is a chrominance component value or a luminance component value.

6. An electronic device, comprising:
   a processor, suitable for executing a computer program; and
   a non-transitory computer-readable storage medium, storing a computer program, the computer program, when executed by the processor, causing the electronic device to implement a decoding method including:
   obtaining a bit stream of a target video sequence and decoding the bit stream of the target video sequence by at least two entropy decoding methods, to obtain a binary symbol string of an unmatched pixel in a target picture block, the target picture block being obtained by dividing a target picture frame in the target video sequence, wherein the at least two entropy decoding methods comprise a first entropy decoding method and a second entropy decoding method and the decoding the bit stream of the target video sequence by at least two entropy decoding methods further comprising:
   obtaining a quantization parameter associated with the bit stream;
   determining a value of a former-preset first target bits of the binary symbol and a value of a post-preset second target bits of the binary symbol based on the quantization parameter and a length of the binary symbol, wherein a sum of the preset first target bits and the preset second target bits is the length of the binary symbol string and a ratio of the preset first target bits and the preset second target bits is dependent upon the quantization parameter; and
   decoding the former-preset first target bits of the binary symbol string by the first entropy decoding method, and decoding the post-preset second target bits of the binary symbol string by the second entropy decoding method, to obtain the binary symbol string of the unmatched pixel in the target picture block;
   inversely binarizing the binary symbol string, to obtain a component value of the unmatched pixel; and obtaining the target picture block based on the component value of the unmatched pixel.

7. The electronic device according to claim 6, wherein the first entropy decoding method is a bypass mode, and the second entropy decoding method is a content adaptive binary arithmetic coding mode.

8. The electronic device according to claim 6, wherein the method further comprises:
before decoding the bit stream of the target video sequence by the at least two entropy decoding methods:
parsing the bit stream of the target video sequence, to obtain at least one of the following identifications:
a first identification, a second identification, a third identification, or a fourth identification, wherein
the first identification is used for indicating whether to use the at least two entropy decoding methods to perform entropy decoding on the unmatched pixel in the target video sequence; the second identification is used for indicating whether to use the at least two entropy decoding methods to perform entropy decoding on the unmatched pixel in the target picture frame in the target video sequence, the target picture frame comprising the target picture block; the third identification is used for indicating whether to use the at least two entropy decoding methods to perform entropy decoding on the unmatched pixel in a target slice in the target picture frame, the target slice comprising the target picture block; and the fourth identification is used for indicating whether to use the at least two entropy decoding methods to perform entropy decoding on the unmatched pixel in the target picture block, wherein
the decoding the bit stream of the target video sequence by at least two entropy decoding methods, to obtain a binary symbol string of an unmatched pixel in a target picture block comprises:
when the first identification, the second identification, the third identification, or the fourth identification is used for indicating that the at least two entropy decoding methods are used for entropy decoding, decoding the bit stream of the target video sequence by the at least two entropy decoding methods, to obtain the binary symbol string of the unmatched pixel in the target picture block.

9. The electronic device according to claim 6, wherein the at least two entropy decoding methods are a default mode for the unmatched pixel; and
the decoding the bit stream of the target video sequence by at least two entropy decoding methods, to obtain a binary symbol string of an unmatched pixel in a target picture block comprises:
decoding the bit stream of the target video sequence in the default mode, to obtain the binary symbol string of the unmatched pixel in the target picture block.

10. The electronic device according to claim 6, wherein the component value of the unmatched pixel is a chrominance component value or a luminance component value.

11. A non-transitory computer-readable storage medium, configured to store a computer program, the computer program, when executed by a processor of an electronic device, causing the electronic device to perform a decoding method including:
obtaining a bit stream of a target video sequence and decoding the bit stream of the target video sequence by at least two entropy decoding methods, to obtain a binary symbol string of an unmatched pixel in a target picture block, the target picture block being obtained by dividing a target picture frame in the target video sequence, wherein the at least two entropy decoding methods comprise a first entropy decoding method and a second entropy decoding method and the decoding the bit stream of the target video sequence by at least two entropy decoding methods further comprising:
obtaining a quantization parameter associated with the bit stream;
determining a value of a former-preset first target bits of the binary symbol and a value of a post-preset second target bits of the binary symbol based on the quantization parameter and a length of the binary symbol, wherein a sum of the preset first target bits and the preset second target bits is the length of the binary symbol string and a ratio of the preset first target bits and the preset second target bits is dependent upon the quantization parameter; and
decoding the former-preset first target bits of the binary symbol string by the first entropy decoding method, and decoding the post-preset second target bits of the binary symbol string by the second entropy decoding method, to obtain the binary symbol string of the unmatched pixel in the target picture block;
inversely binarizing the binary symbol string, to obtain a component value of the unmatched pixel; and
obtaining the target picture block based on the component value of the unmatched pixel.

12. The non-transitory computer-readable storage medium according to claim 11, wherein the first entropy decoding method is a bypass mode, and the second entropy decoding method is a content adaptive binary arithmetic coding mode.

13. The non-transitory computer-readable storage medium according to claim 11, wherein the at least two entropy decoding methods are a default mode for the unmatched pixel; and
the decoding the bit stream of the target video sequence by at least two entropy decoding methods, to obtain a binary symbol string of an unmatched pixel in a target picture block comprises:
decoding the bit stream of the target video sequence in the default mode, to obtain the binary symbol string of the unmatched pixel in the target picture block.

14. The non-transitory computer-readable storage medium according to claim 11, wherein the component value of the unmatched pixel is a chrominance component value or a luminance component value.

\* \* \* \* \*